Figure 1:
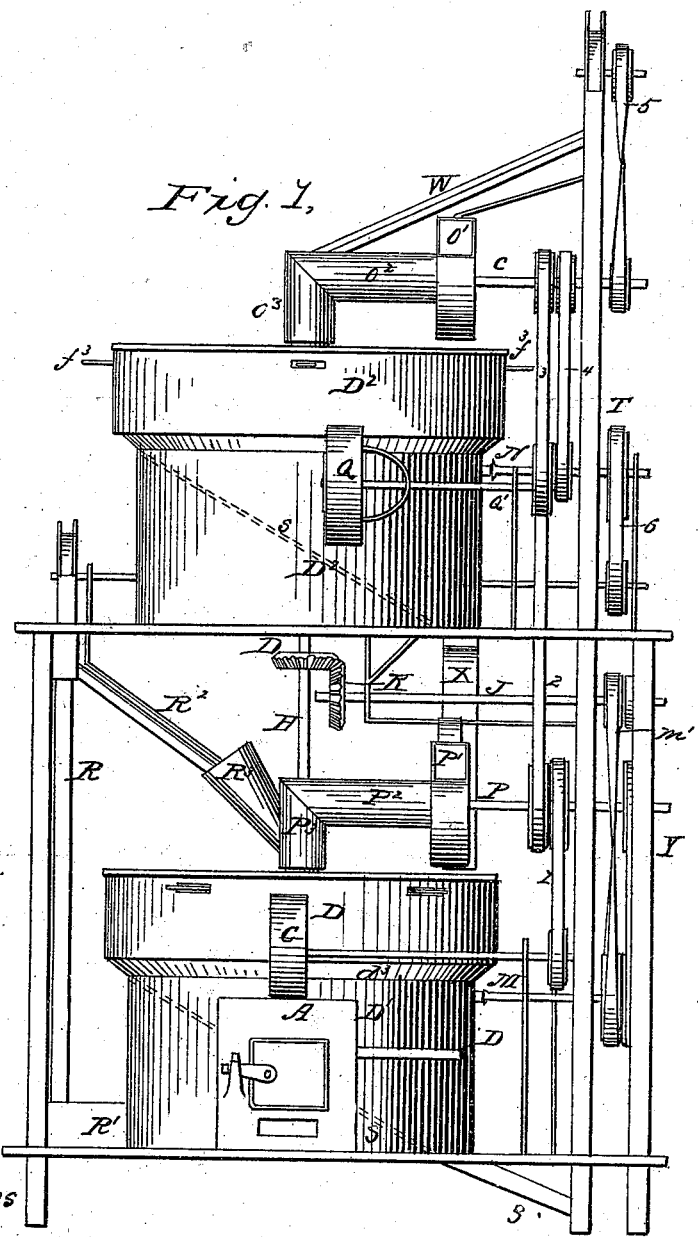
Figure 2:
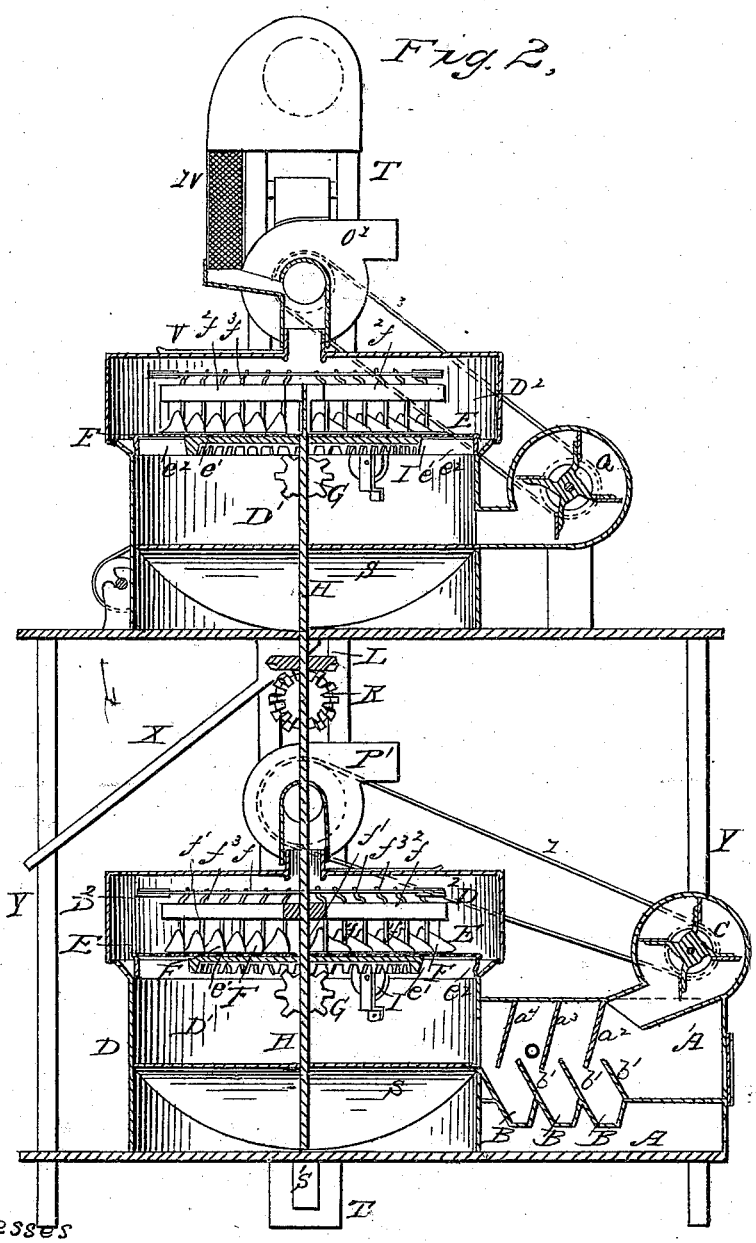
Figure 3:
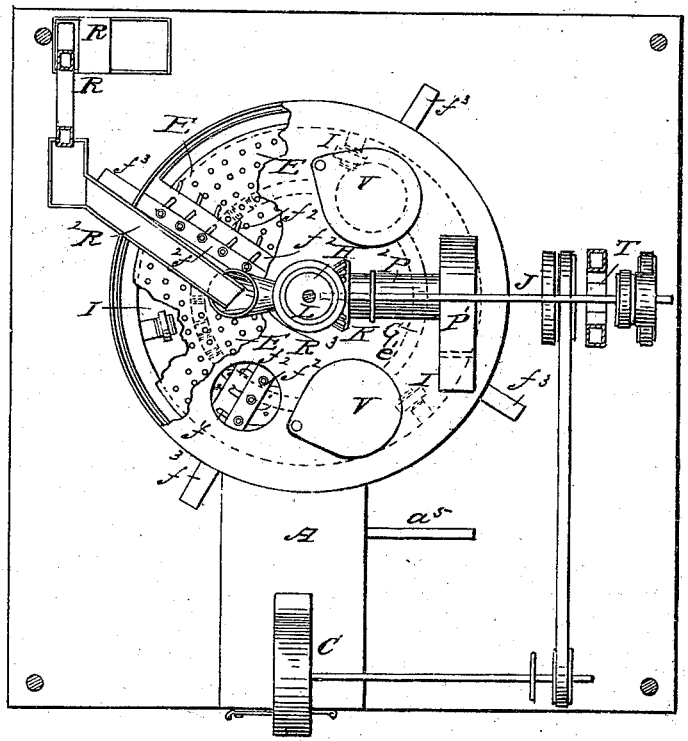

F. H. C. MEY.
Grain Drier.

No. 42,333.

3 Sheets—Sheet 1.

Patented April 12, 1864.

Witnesses
Geo. S. Wardwell
E. B. Forbush

Inventor
F. H. C. Mey

F. H. C. MEY.
Grain Drier.

No. 42,333.

3 Sheets—Sheet 2.

Patented April 12, 1864.

Witnesses
Geo. S. Wardwell
E. B. Forbush

Inventor
F. H. C. Mey

F. H. C. MEY.
Grain Drier.

No. 42,333.

3 Sheets—Sheet 3.

Patented April 12, 1864.

Witnesses:
Geo. S. Wardwell
E. B. Forbush

Inventor
F. H. C. Mey

UNITED STATES PATENT OFFICE.

FREDERICK H. C. MEY, OF BUFFALO, NEW YORK, ASSIGNOR TO HIMSELF, A. B. NIMBS, AND J. C. CLIFFORD, OF SAME PLACE.

IMPROVEMENT IN GRAIN-DRIERS.

Specification forming part of Letters Patent No. 42,333, dated April 12, 1864.

*To all whom it may concern:*

Be it known that I, FREDERICK H. C. MEY, of the city of Buffalo, county of Erie, and State of New York, (assignor to myself and ARHEUNA B. NIMBS and JOHN C. CLIFFORD, of the same p'ace,) have invented a new and Improved Caloric and Frigorific Grain and Malt Drier; and I do hereby declare that the following is a full and exact description thereof, reference being made to the accompanying drawings, making a part of this specification, in which—

Figure I is a front elevation. Fig. II is a vertical section. Fig. III is a top plan view.

Letters of like name and kind refer to like parts in each of the figures.

A represents the furnace, which is connected with the drier, for furnishing purified hot air therefor. This furnace is of peculiar construction. A is outer wall of the furnace. A' is the fire-chamber. $a^2$ $a^3$ $a^4$ are overhanging cant (either stationary or adjustable) plates, for directing the air into the purifying-chambers B. These purifying-chambers B have cantp'ates $b'$ (either stationary or adjustable) projecting upwardly, and are so constructed and arranged in reference to the cant-plates $a^2$ $a^3$ $a^4$ that the air will be directed from the first into the second, and from the second into the third, and so on until it reaches the drier.

In order to purify the air before it reaches the grain, a quantity of saltpeter and water is put into the first, and quicklime in the second, and water into the third of these purifying-chambers, with which the air comes in contact in each chamber as it passes through, which relieves the air of whatever carbonic-acid gas or other impure vapor with which it may be impregnated, so that when the air reaches the grain in the drier it is completely and thoroughly purified and sweetened. The cant-plates $b'$ may be perforated with small holes near the top thereof, so as to facilitate the passage of the air from one chamber to the other.

$a^5$ is a steam or water-dripping pipe to furnish a mist or shower of water or steam, through which the air must pass on its way to the drying-chamber for the purpose of facilitating the purifying process.

C is a blower placed slightly above the furnace, so as to drive the air downwardly into the first chamber.

D represents the caloric or drying chamber, which is made in a cylindrical form. This chamber is formed within and by the combination of the lower cylindrical case, D', and the outer cylindrical overhanging and revolving cap, $D^2$. Within this chamber is placed and operated a revolving perforated drying-plate, E, and the revolving plows or stirrers F. On the under side of this perforated plate is fixed a gear-rim, $e'$, which meshes with the pinion G, and by which the plate is caused to revolve. The plow-shafts $f'$ pass up through the beams $f^2$ and connect with the reversing-bars $f^3$, which bars project through the cap $D^2$, as shown in Fig. III, so that by means of the reversing-bars the position of the plows may be changed so as to quickly carry the grain off over the edge of the plate, or to retain it for a greater length of time thereon, and until it is sufficiently dried. When the plows stand in one position they will retain the grain upon the drying-table, and when changed to the other position they will carry the grain off over the edge of the table.

The plow-beams $f^2$ are made fast to the vertical shaft H, as is also the cap $D^2$, and are made to revolve in an opposite direction to the plate E, so that the grain will be kept in motion and thoroughly stirred while it remains upon the plate, and so that the hot and purified air, at a very high temperature, from the furnace, which is forced through the perforations and through the grain while it is thus in motion, will have its full effect to dry the grain without scorching it, and at the same time the purified air will improve the quality of the grain. The outer cap, $D^2$, has a greater diameter than the lower cylinder case, D', so that it will lap over it and revolve freely. The lower cylinder case is made a little flaring or dishing at the top, as shown at $d^3$, so as to catch the grain as it is thrown by the operation of the plows over the edge of the plate. An apron is made of fine proof-cloth and attached to the edge of the plate, as shown at $e^2$, so that none of the heat shall escape. The perforated plate E is placed nearly on a level with the top of this flaring part. The grain goes into this caloric chamber through the spout $P^3$ at the center thereof, and is by the plows thrown outwardly until it drops off over the edge of the plate. As it drops from the plate it falls upon the inclined plate S, (which is shown in dotted lines in Fig. I,) and by that plate is conducted into the spout S' and thence to the elevator T.

I, Fig. II, represents one of three rollers which support the drying-plate E, and upon which the said plate revolves. These three rollers are shown in Fig. III.

The frigorific or cooling apparatus is made precisely like the caloric or drying apparatus already described, and is placed above, as represented in the drawings, and the several parts are represented and referred to by similar letters.

J represents the main driving-shaft, which takes its power from the engine. This drives the vertical shaft H by means of the pinions K L.

M is a shaft which drives the lower drying-plate, E. The pinion G is on the end of this shaft. This shaft is driven by means of the belt $m'$, which passes over a pulley on shaft J and a pulley on shaft M.

N is a shaft which drives the upper frigorific or cooling table, E.

O' is the upper exhaust or suction blower, and $O^2$ a suction or exhaust pipe from the cooling apparatus, and P' is an exhaust or suction blower, and $P^2$ a suction or exhaust pipe for the drying apparatus.

Q is a blower for forcing cold air into the cooling apparatus, and Q' shaft for driving the same.

R is an elevating-leg of ordinary construction, the foot of which stands in the hopper or grain receiver R'. The elevating-leg takes the grain to be dried from the hopper R' and carries it up and discharges it through the spout $R^2$ and $R^3$ and pipe $P^3$ into the drying or caloric chamber D.

S' is a spout which conducts the grain after it is dried from the inclined plate S to a receiver.

T is an elevating-leg, the foot of which stands in a receiver. It is of common construction, and is for the purpose of elevating the grain after it is dried and delivering it to the cooler.

W is a screen which receives the grain from the elevator and carries it to the pipe $O^3$ into the cooler.

X is a screen which conducts the grain from the cooler into appropriate receivers outside.

The parts of the cooler are the same and the operation in all respects the same as the drier, except that a blast of cold air is used instead of hot air.

V represents a door in the top of the cap $D^2$, which may be opened and closed at pleasure to allow the dust and evaporation to escape.

Y are posts or walls of the building in which is contained the drying and cooling apparatus.

1, 2, 3, 4, 5, 6 are driving-belts, which pass over appropriate pulleys on the shafts for driving the respective parts.

What I claim as my invention, and desire to secure by Letters Patent, is—

1. The furnace A, provided with purifying-chambers B, for the purposes and substantially as described.

2. The revolving perforated table E and reversible plows F, in combination with either the drying or cooling chamber D, constructed, arranged, and operating substantially as described.

3. The steam or water pipe $a^5$, in combination with a furnace, A, and grain-drying chamber D, for the purpose of purifying the air, substantially as set forth.

4. The combination and arrangement of the suction-blower P', including the pipes $P^2$ $P^3$, with the drying or cooling apparatus, as described.

5. The application and use of purifying-chambers interposed between the furnace and the drier, through which chambers the hot air of the furnace must pass on its way to the drier, substantially as described.

F. H. C. MEY.

Witnesses:
E. B. FORBUSH,
P. H. MUEHLY.